United States Patent
Hoyes

(10) Patent No.: US 12,235,238 B2
(45) Date of Patent: Feb. 25, 2025

(54) ION MOBILITY SEPARATION DEVICE

(71) Applicant: Micromass UK Limited, Wilmslow (GB)

(72) Inventor: John Brian Hoyes, Stockport (GB)

(73) Assignee: Micromass UK Limited, Wilmslow (GB)

( * ) Notice: Subject to any disclaimer, the term of this patent is extended or adjusted under 35 U.S.C. 154(b) by 327 days.

(21) Appl. No.: 17/635,325

(22) PCT Filed: Sep. 17, 2020

(86) PCT No.: PCT/GB2020/052259
§ 371 (c)(1),
(2) Date: Feb. 14, 2022

(87) PCT Pub. No.: WO2021/053342
PCT Pub. Date: Mar. 25, 2021

(65) Prior Publication Data
US 2022/0291167 A1    Sep. 15, 2022

(30) Foreign Application Priority Data
Sep. 17, 2019 (GB) .................................... 1913378

(51) Int. Cl.
*G01N 27/622* (2021.01)
*G01N 27/623* (2021.01)

(52) U.S. Cl.
CPC ......... *G01N 27/623* (2021.01); *G01N 27/622* (2013.01)

(58) Field of Classification Search
None
See application file for complete search history.

(56) References Cited

U.S. PATENT DOCUMENTS

| | | |
|---|---|---|
| 6,894,286 B2 | 5/2005 | Derrick et al. |
| 6,914,241 B2 | 7/2005 | Giles et al. |

(Continued)

FOREIGN PATENT DOCUMENTS

| | | |
|---|---|---|
| CN | 104126116 A | 10/2014 |
| CN | 109003876 A | 12/2018 |
| WO | 2016170371 A1 | 10/2016 |

OTHER PUBLICATIONS

Combined Search and Examination Report under Sections 17 and 18(3) for Application No. GB2014674.2, dated Mar. 8, 2021, 8 pages.

(Continued)

*Primary Examiner* — Eliza W Osenbaugh-Stewart
(74) *Attorney, Agent, or Firm* — Goodwin Procter LLP

(57) ABSTRACT

A method of separating ions according to their ion mobility using an ion mobility separation device including a first section and a second section is disclosed, comprising: urging ions through the first section against a first opposing electric field using a first driving force provided by a first set of time varying voltage(s) or voltage waveform(s); progressively reducing the magnitude of the first opposing electric field and/or progressively increasing the magnitude of the first driving force; and driving ions through the second section against a second opposing electric field using a second drive force provided by a second set of time-varying voltage(s) or voltage waveform(s); wherein the magnitude of the second opposing electric field is progressively reduced and/or the magnitude of the second driving force is progressively increased in tandem with reducing the magnitude of the first opposing electric field and/or increasing the magnitude of the first driving force.

18 Claims, 2 Drawing Sheets

(56) References Cited

U.S. PATENT DOCUMENTS

2004/0031920 A1    2/2004  Giles et al.
2004/0245452 A1    12/2004 Bateman et al.
2013/0299690 A1    11/2013 Shvartsburg et al.
2019/0237319 A1    8/2019  Green et al.

OTHER PUBLICATIONS

International Search Report and Written Opinion for International application No. PCT/GB2020/052259, mailed Nov. 27, 2020, 15 pages.
Nahin, M., et al., "Modeling of an Inverted Drift Tube for Improved Mobility Analysis of Aerosol Particles", Scientific Report 7:6456 (2017).
Search Report under Section 17(5) for Application No. GB1913378.4, dated Jul. 29, 2020, 3 pages.
Shvartsburg, A.A., and Smith, R.D., "Fundamentals of Traveling Wave Ion Mobility Spectrometry", Anal Chem 80(24): 9689-9699 (2008).

ION MOBILITY SEPARATION DEVICE

CROSS-REFERENCE TO RELATED APPLICATIONS

This application is a U.S. national phase filing claiming the benefit of and priority to International Patent Application No. PCT/GB2020/052259, filed Sep. 17, 2020, which claims priority from and the benefit of United Kingdom Patent Application No. 1913378.4 filed on Sep. 17, 2019. The entire contents of these applications are incorporated herein by reference.

FIELD OF THE INVENTION

The present invention relates to ion mobility separation devices, which may be used as part of an ion analysis instrument such as an ion mobility and/or mass spectrometer.

BACKGROUND

Ion mobility separators are known in which ions are urged through a gas so as to separate the ions according to their mobility. Various types of ion mobility separators exist.

For instance, in so-called "drift tube" ion mobility separators, ions are urged through, and thereby cause to interact with, a buffer gas by a substantially constant, uniform electric field. The ions then separate temporally according to their mobility in the buffer gas as they travel through the drift tube device.

Instead of using a uniform electric field, another approach is to drive ions through the gas-filled device using so-called "traveling wave" potentials, as described, for example, in "Fundamentals of Traveling Wave Ion Mobility Spectrometry", Shvartsburg and Smith, *Anal. Chem.* 2008 Dec. 15; 80(24): 9689-9699.

Further, by applying a suitably opposing electric field to the traveling wave device, the ions can be caused to take up equilibrium positions along the length of the device, where the motive force provided by the traveling waves matches the force provided by the opposing electric field, with the equilibrium positions thus being a function of ion mobility. By progressively reducing the opposing electric field, ions can thus be selectively released in order of their mobility.

An example of such an ion mobility separator, wherein ions spatially separate within the device according to their ion mobility and assume different essentially static or equilibrium axial positions along the length of the device, is described in U.S. Pat. No. 6,914,241 (MICROMASS UK LIMITED).

However, the Applicants believe that there remains scope for improved methods and devices for separating ions according to ion mobility.

SUMMARY

According to an aspect there is provided a method of separating ions according to their ion mobility using an ion mobility separation device including a first section comprising a first plurality of electrodes and a second section comprising a second plurality of electrodes, the method comprising: urging ions through the first section against a first opposing electric field using a first driving force provided by a first set of one or more time-varying voltage(s) or voltage waveform(s) applied to the electrodes of the first section, the first opposing field increasing in magnitude along the length of the first section, such that the ions are caused to distribute along the first section at equilibrium positions determined by their mobility; progressively reducing the magnitude of the first opposing electric field and/or progressively increasing the magnitude of the first driving force over time so that ions sequentially pass from the first section into the second section in order of mobility; and driving ions through the second section against a second opposing electric field using a second drive force provided by a second set of one or more time-varying voltage(s) or voltage waveform(s) applied to the electrodes of the second section such that ions separate temporally in the second section, wherein the magnitude of the second opposing electric field is progressively reduced and/or the magnitude of the second driving force is progressively increased in tandem with reducing the magnitude of the first opposing electric field and/or increasing the magnitude of the first driving force.

According to another aspect there is provided an ion mobility separation device comprising: a first section comprising a first plurality of electrodes, wherein ions are urged in use through the first section against a first opposing electric field by a first driving force provided by a first set of one or more time-varying voltages or voltage waveforms applied to the electrodes of the first section, the first opposing field increasing in magnitude along the length of the first section, such that the ions are caused to distribute along the first section at equilibrium positions determined by their mobility; a second section comprising a second plurality of electrodes, wherein ions are driven in use through the second section against a second opposing electric field by a second driving force provided by a second set of one or more time-varying voltages or voltage waveforms applied to the electrodes of the second section such that ions separate temporally in the second section; and a control circuit configured to: progressively reduce the magnitude of the first opposing electric field and/or progressively increase the magnitude of the first driving force over time in tandem with the second opposing electric field and/or second driving force to cause ions to sequentially pass from the first section into the second section in order of mobility and to separate in the second section according to mobility.

The above arrangements provide improved techniques for separating ions according to their mobility by providing an ion mobility separation device with relatively high resolution and charge (ion) capacity.

For instance, when using spatially separating arrangements like those described in U.S. Pat. No. 6,914,241 (MICROMASS UK LIMITED), wherein the ions are caused to assume different essentially static or equilibrium axial positions along the length of the device and are then progressively released in order of their mobility, the resolution offered by such a device may be relatively limited when used by itself as an ion mobility separator.

Further, ions must typically be gated into the device to define a narrow time packet of ions. To this end, in more traditional arrangements, the ions may be accumulated in an ion trap upstream of the ion mobility separator, and then released into the ion mobility separator as a single packet of ions. However, this may introduce undesirable space-charge effects that can lead to mass discrimination and ion losses which ultimately limit the overall duty cycle and charge capacity of the ion mobility separator.

In the present embodiments rather than using such a spatially separating device as an ion mobility separator by itself, it is recognized that similar such devices can advantageously be utilized as a 'first section' of an ion mobility separation device from which ions can be progressively introduced into a 'second section' of the ion mobility separation device where they can be separated temporally according to their mobility.

The spatially separating device defining the first section therefore effectively acts as an upstream ion trapping or gating region for the second section (although in the present embodiments ions are introduced into the second section gradually, rather than as a pulsed packet of ions as would be the case in other more traditional ion trapping or gating arrangements).

Because the ions spatially distribute along the length of the first section space charge effects are thereby reduced, and the first section may thus support a higher charge capacity than more conventional ion traps. The ions can then be gradually introduced from the first section into the second section wherein a high resolution temporal separation can be performed with the ions working against a second opposing field applied to the electrodes of the second section to increase the resolution of this separation.

The device is then scanned at a predetermined rate to allow ions to gradually pass from the first section into the second section in order of their mobility and to then separate temporally therein, thereby providing a highly effective and high resolution ion mobility separation.

In particular, by scanning the first and second sections in tandem with each other, it is possible to gradually pass ions from the first section into the second section in order of mobility, whilst substantially optimizing the resolution separation in the second section, allowing the separation parameters in the second section to 'track' the mobilities of the ions that are received from the first section.

In embodiments, ions sequentially pass from the first section into the section in order of mobility from high to low. This means that the ions are passed out of the first section in the correct mobility order such that there is no possibility for high mobility ions to overtake lower mobility ions in the second section as they are temporally separate. Indeed it is an advantage of using respective sets of time-varying voltages or voltage waveforms (the first/second sets of time-varying voltages of voltage waveforms thus comprising first/second sets of one or more "traveling waves") to urge the ions along the first section (and to drive the ions through the second section) that the ions can be (and in an embodiment are) caused to separate in mobility order from low to high along the length of the device such that the ions can be passed from the first section in mobility order from high to low.

In principle however it would also be possible to configure the respective driving forces and opposing fields such that the ions are caused to separate in the opposite manner, i.e. such that they can be passed from the first section in mobility order from low to high.

It will also be appreciated that the use of traveling waves to spatially separate the ions in the first section (and to cause the ions to temporally separate in the second section) may help to simplify the control arrangements (compared to other types of ion mobility separators employing, for instance, gas flows) since the ions can be caused to pass from the first section into the second section (and separate therein) by suitably adjusting the voltages or voltage waveforms to either adjust the magnitude of the opposing force or to adjust the magnitude of the driving force (e.g. by adjusting the speed and/or amplitude of the traveling waves, in the usual fashion).

Further, because the ions are trapped in the first section, there is, in effect, complete freedom over the rate at which the device is scanned such that the device can easily be coupled with downstream detectors that may operate over different characteristics timescales to conventional ion mobility separators, especially those that have relatively slower sampling rates such as multi-reflecting time of flight mass analyses, and similar.

The present embodiments thus provide various improvements compared to prior approaches.

The first section comprises a plurality of electrodes. For example, the first section may comprise an 'ion tunnel' ion guide and may comprise a stack of plate or ring electrodes having apertures therein through which ions travel in use. In another embodiment the first section may comprise a segmented rod set, which may comprise a multipole rod set such as a quadrupole, hexapole, octapole, and so on. Other arrangements would of course be possible.

Similarly, the second section may independently comprise an 'ion tunnel' ion guide and may comprise a stack of plate or ring electrodes having apertures therein through which ions travel in use, or a segmented rod set, or any other suitable arrangement of electrodes.

The electrodes of the first and second sections may be of the same type. However, it is also contemplated that the first and second sections may be different from one another.

The first and second sections may comprise (or comprise part of) an AC or RF ion guide. Ions may thus be confined radially within the first and/or second sections of the device by an AC or RF electric field.

The traveling waves may comprise a set of one or more transient DC voltages of voltage waveforms that are translated along the length of the device. That is, the one or more time-varying voltage(s) or voltage waveform(s) applied to the first and/or second sections of the device may comprise transient DC voltage(s) or voltage waveform(s). For example, the traveling waves may be implemented in a similar manner as described in U.S. Pat. No. 6,914,241 (MICROMASS UK LIMITED).

In that case, the ions may be confined radially by an AC or RF electric field that is applied additionally to the transient DC voltages of voltage waveforms used to urge/drive the ions along the device.

However other arrangements would be possible. For instance, rather than using a set of one or more transient DC voltages of voltage waveforms to provide a 'pulsed' set of traveling waves, it would also be possible to implement a smoothly varying traveling wave.

For example, in other embodiments the time-varying voltages or voltage waveforms may comprise AC or RF voltages or voltage waveforms. In particular, by applying suitable AC or RF voltages or voltage waveforms such that there is a phase offset between different electrodes in the device, a traveling wave is generated that acts to translate ions along the length of the device in the direction of propagation of the traveling wave.

An example of such an arrangement is described in U.S. Pat. No. 6,894,286 (UNIVERSITY OF WARWICK). In that case, the traveling wave may provide not only the driving forces for urging/driving ions along the first and/or second section, but may also act to confine the ions radially.

In general, any suitable combination of time-varying voltages or voltage waveforms that can be used to generate a suitable traveling wave driving force may be used.

It will be appreciated that the first and second sections are gas-filled regions. The first and second sections may comprise any suitable buffer gas that may desirably be used for ion mobility separations. Various examples of suitable buffer gases are known.

The first and second sections may be maintained in use at a pressure such that a viscous drag is imposed upon ions passing through the first and second sections. The first and/or second sections may for instance be maintained in use at a pressure selected from the group consisting of: (i) greater than or equal to 0.0001 mbar; (ii) greater than or equal to 0.0005 mbar; (iii) greater than or equal to 0.001 mbar; (iv) greater than or equal to 0.005 mbar; (v) greater than or equal to 0.01 mbar; (vi) greater than or equal to 0.05 mbar; (vii) greater than or equal to 0.1 mbar; (viii) greater than or equal to 0.5 mbar; (ix) greater than or equal to 1 mbar; (x) greater than or equal to 5 mbar; and (xi) greater than or equal to 10 mbar.

Although the first and second sections are described separately, and may be two physically distinct devices, it will be appreciated that the first and second section may in embodiments be part of the same device (set of electrodes). In that case, the extent of the first and second sections may be determined dynamically by the electric fields applied thereto. Various arrangements would be possible in this respect.

The first opposing field applied to the electrodes of the first section increases in magnitude along the length of the first section. The first opposing field thus increases with position along the length of the device such that the opposing force provided by the first opposing field is largest at the exit of the first section (adjacent to the second section). The first opposing field may increase linearly along the length of the first section. However, other arrangements would of course be possible. For instance, the first opposing field may increase in a non-linear manner, for instance such that the gradient of the first opposing field increases along the length of the device.

(It will be appreciated that the ions may either be positive or negative, for example, depending on the polarity of the ion source of the instrument within which the ion mobility separation device is being used. The first opposing field 'increasing' along the length of the device should therefore be understood accordingly to mean that the opposing force provided by the first opposing field increases along the length of the device to urge the ions back towards the entrance of the first section.)

This has the effect that ions are caused to distribute spatially and take up essentially static axial positions along the length of the first section as a function of their ion mobility. In particular the equilibrium position for an ion having a certain ion mobility will be determined based on the position at which the motive force urging the ion along the first section (the first driving force) substantially matches the force provided by the first opposing field (e.g., such that ions having different mobilities will have different equilibrium positions determined by those mobilities).

By contrast, the second opposing field at least in some embodiments is substantially constant, or uniform, along the length of the second section of the device (although the magnitude may change over time as the device is scanned, as will be explained further below). For instance, the second opposing field may be generated by applying a linear potential to at least some of the electrodes of the second section to generate a uniform electric field, e.g. that is substantially constant along at part of the second section of the device defined by those electrodes.

The second opposing field thus acts to increase the effective length of separation in the second section (or conversely allows for a more compact device) by causing the ions to perform additional work. However, the second opposing field is selected such that the driving force is still sufficient to cause ions to separate temporally along the length of the device and pass out of the second section as a function of time.

The magnitude of the second opposing field may therefore be selected, and in embodiments varied over time, based on the mobility of the ions that are presently being analyzed, which is determined based on which ions are being passed out from the first section.

For example, in the present embodiments the device is scanned such that ions of a sample trapped in the first section sequentially pass into the second section in order of their mobility (from high to low) and are separated therein. The device may be scanned by reducing the magnitudes of the first and second opposing fields and/or by increasing the magnitudes of the first and second driving forces. In embodiments, scanning the device may involve a combination of reducing the magnitudes of the first and second opposing fields and increasing the magnitudes of the first and second driving forces.

Thus, in embodiments the first and second opposing fields may be reduced in tandem with one another to this effect. The first and second opposing fields may thus be reduced essentially simultaneously according to a predetermined rate that allows a gradual introduction of ions from the first section into the second section and a temporal separation of those ions in the second section.

The effect of this may be that during an experimental run (a single experiment analyzing a particular sample) different ions originating from the sample, e.g. and having different mobilities, that are trapped in the first section are released at different times, in sequence according to their mobility, such that different ions released from the first section experience different separation conditions in the second section. That is, a first set of ions that are released from the first section at a first time experience different separation conditions to a second set of ions (from the same sample) released from the first section at a second, later time.

Alternatively, rather than progressively reducing the magnitude of the first and second opposing fields, or in addition thereto, the magnitude of the driving forces may be progressively increased to the same effect, to gradually introduce ions from the first section into the second section and to cause the ions to separate temporally in the second section.

Of course, it is also possible that this operation may be achieved by reducing the first opposing field in combination with increasing the second driving force, or vice versa.

For ions having relatively higher mobilities the opposing field in the second section can therefore be relatively higher (and/or the second driving force can be relatively lower). However, as ions having lower mobilities are passed to the second section by further reducing the first opposing field (and/or increasing the first driving force), the opposing field in the second section may need to be reduced (and/or the second driving force increased) correspondingly to allow the ions to continue to be able to pass through the second section.

Typically the device is scanned in a continuous manner to allow ions to continuously pass from the first section into the second section, to separate therein, and to then pass out of the device from the second section. That is, the magnitudes of the opposing fields and/or driving forces may be changed in a continuous manner. However, the device could also be scanned in a stepped manner to allow the ions to re-equilibrate in the first section between steps. That is, the magnitudes of the opposing fields and/or driving forces may be changed in a stepped manner.

Because the ions are trapped in the first section, the rate at which the opposing fields are reduced, or the rate at which the driving forces are increased, can be arbitrarily controlled. For example, the rate may be selected based on (to match) a timescale associated with a downstream separation. For example, in embodiments, the ions passing out of the second section may then be passed to a mass analyzer and the rate at which the device is scanned may be selected based on a characteristic timescale of the mass analysis.

In particular, the mass analyzer may comprise a multi-reflecting ("folded flight path") time of flight mass analyzer having a relatively extended flight time. The rate at which the opposing fields are reduced can thus be selected accordingly to allow the ion mobility separation device to be successfully coupled to the multi-reflecting time of flight mass analyzer. Other arrangements would of course be possible.

Thus, the method may comprise mass analyzing the ions that have been separated in the second section. In embodiments, the ions are mass analyzed using a time of flight mass analyzer, optionally wherein the time of flight mass analyzer is a multi-reflecting time of flight mass analyzer.

The present embodiments thus also relate to a mass spectrometer comprising an ion mobility separation device as described herein according to any of the aspects and embodiments of the present disclosure and a mass analyzer for mass analyzing ions that have been separated in the second section.

In embodiments, a further ion trap (or plural ion traps) may be provided upstream of the first section. Ions may thus also be introduced into the first section as a series of one or more ion packet(s). The further ion trap(s) upstream of the first section may take any suitable form.

However, to maximize the space charge capacity, in embodiments, the further ion trap may in embodiments also comprise a trap of substantially the same type as the first section described herein, wherein ions are caused to distribute along the length of the ion trap at equilibrium positions determined by their mobility.

For instance, the ions may be trapped by a combination of an urging force provided by traveling waves, or a gas flow, and an opposing electric field that varies (increases) with position along the length of the ion trap. Other arrangements would of course be possible.

By trapping ions before the first section, the ions can then be isolated during the extraction step wherein ions are passed from the first section into the second section. That is, ions can be prevented from entering the first section at least during an ion gating event (whilst the first opposing electric field is low, etc.).

The device may be scanned until all of the ions in the first section have passed into the second section. For instance, the device could be scanned until substantially all of the ions in the first section have passed to the second section, and new ions only allowed into the first section once the scan is complete. The first section can then re-filled with ions and the scan repeated in the same manner described above. Thus, whilst embodiments have been described with respect to a single set of ions, it will be appreciated that the scan (cycle) will typically be repeated multiple times during the course of an experiment for multiple different sets of ions.

However, it would also be possible to continually fill the first section during the course of an experiment in order to increase duty cycle. In particular, when the device is scanned in a stepped manner, ions may be passed into the first section from an upstream ion trap for a first time period during which the opposing fields and/or driving forces are kept constant (an ion accumulation event). The ions can then pass into the first section, and be allowed to reach their equilibrium positions before the next step is performed. In this case, when the device is stepped to scan ions from the first section into the second section, new ions should be prevented from entering the first section. An upstream ion trap may be used for this reason.

A control circuit is provided for controlling the operation of the device. The control circuit may generally control one or more power (voltage) supplies and/or gas supplies that are connected to the first and second sections in order to control the operation of the ion mobility separation device in the manner of the various embodiments described herein.

The control circuit may comprise suitable processing circuitry configured to perform any one or more or all of the necessary processing operations in respect of the various embodiments described herein. The control circuit may be implemented in hardware or software, as desired. In various embodiments, the control circuit may comprise a suitable computing device, a microprocessor system, a programmable FPGA (field programmable gate array), and the like.

BRIEF DESCRIPTION OF THE DRAWINGS

Various embodiments will now be described, by way of example only, and with reference to the accompanying drawings in which.

DETAILED DESCRIPTION

Figure 1:
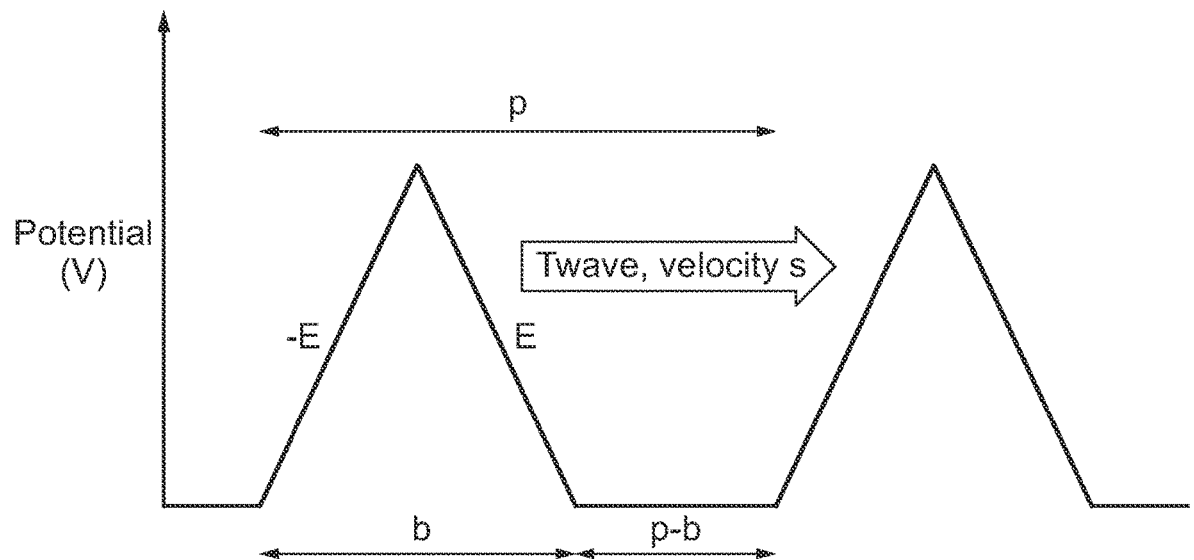
FIG. 1 schematically illustrates the concept of traveling wave separation.

The present embodiments are directed towards an ion mobility separation device comprising a first section that acts to spatially separate ions such that ions are caused to assume essentially static equilibrium positions along the length of the first section before being passed from the first section into a second section in which the ions are separated temporally.

Various embodiments will now be described in relation to a traveling wave device. As will be understood by those skilled in the art, in a traveling wave device, a repeating pattern of electrical potentials is typically superimposed along the length of the device so as to form a periodic waveform. The waveform is caused to travel along the device in the direction in which it is required to move the ions and at the velocity at which it is required to move the ions. Thus, a traveling wave effectively comprises one or more electric potential(s) that are traveled along the length of the device.

In embodiments, the traveling waves may be implemented as a set of one or more transient DC voltage(s) or voltage waveform(s) applied to the electrodes of the first and/or second sections of the device. In that case, the ion guides forming the first and second sections may be segmented in the axial direction so that independent transient DC potentials can be applied to each segment. The transient DC potentials may thus be superimposed on top of an AC or RF voltage which acts to radially confine ions and/or any constant DC offset voltage. The transient DC potentials generate a traveling wave which moves in the axial direction.

Ions may thus be radially confined within the ion mobility separation device in a pseudo-potential well and are urged axially by a real potential barrier or well.

The one or more transient DC voltages may create: (i) a potential hill or barrier; (ii) a potential well; (iii) a combination of a potential hill or barrier and a potential well; (iv) multiple potential hills or barriers; (v) multiple potential wells; or (vi) a combination of multiple potential hills or barriers and multiple potential wells.

The one or more transient DC voltage waveforms may comprise a repeating waveform such as a square wave.

The one or more transient DC voltage waveforms may create a plurality of potential peaks or wells separated by intermediate regions. The DC voltage gradient in the intermediate regions is preferably non-zero and may be either positive or negative. The DC voltage gradient in the intermediate regions may be linear or non-linear. For example, the DC voltage gradient in the intermediate regions may increase or decrease exponentially.

The amplitude of the potential peaks or wells may remain substantially constant or the amplitude of the potential peaks or wells may become progressively larger or smaller. The amplitude of the potential peaks or wells may increase or decrease either linearly or non-linearly.

At any instant in time a voltage gradient is thus generated between segments which act to push or pull ions in a certain direction. As the ions move in the required direction so does the voltage gradient. The individual DC voltages on each of the segments may be programmed to create a required waveform. The individual DC voltages on each of the segments may also be programmed to change in synchronism so that the DC potential waveform is maintained but is translated in the direction in which it is required to move the ions.

However, other arrangements would be possible. For instance, in other embodiments, the traveling waves may be implemented as a set of one or more AC or RF voltages or voltage waveforms applied to at least some of the electrodes of the first and/or second sections of the device so that ions are urged along at least a portion of the length of the ion mobility separator.

In that case, a set of suitably phase shifted AC or RF voltage waveforms may be sequentially and repetitively applied to the electrodes of the first and/or second sections in order to generate a traveling wave that acts to urge ions along the axis of the device. In particular, the AC or RF voltages or voltage waveforms may be set up such that there is a phase difference between adjacent electrodes, or sets of electrodes, such that the phase of a first AC or RF voltage waveform at a first electrode along the length of the device is less than π radians ahead of the phase of the first AC or RF voltage waveform of a second electrode along the length of the device.

This arrangement has the effect that a traveling wave is generated that acts to translate ions along the device whilst also focusing the ions radially, due to the "Paul" effect.

The phase difference between adjacent (sets of) electrodes may be set at any suitable value, as desired. Typically, the phase difference is given by 2π/n, where n is an integer greater than two. Increasing the value of n may provide a smoother transmission of ions.

The AC or RF voltage waveforms may comprise sinusoidal waveforms. However, any suitable waveforms may be used, including triangular waveforms, square waveforms, and so on.

In some cases a set of anti-phase voltages may be superimposed onto alternating electrodes (or sets of electrodes) along the device simultaneously with the phase shifted AC or RF voltage waveforms described above. In this way a composite waveform may be generated that effectively generates a series of static traps along the axis of the device, with the ions then being driven from trap to trap.

Various other suitable arrangements for generating traveling waves may be used, as desired.

The ion mobility separator may comprise a plurality of electrodes, each electrode having an aperture through which ions are transmitted in use. Each electrode may have a substantially circular aperture. Each electrode may have a single aperture through which ions are transmitted in use. The diameter of the apertures may remain substantially constant, or may become progressively smaller or larger along the length of the device (an ion funnel). According to another embodiment the ion mobility separator may comprise a segmented rod set. Other arrangements would of course be possible.

The principles of traveling wave separation are now well understood and are described, for instance, at least for the case of DC traveling waves, in "Fundamentals of Traveling Wave Ion Mobility Spectrometry"—Shvartsburg and Smith, *Anal. Chem.* 2008 Dec. 15; 80(24): 9689-9699, which presents a description of traveling waves using a triangular voltage waveform. Other voltage waveforms may of course be used, such as square wells, and the like. However, this simplified triangular waveform is amenable to analytical expression for average velocity imparted to an ion in a viscous (mobility type) region. This is illustrated in FIG. 1.

In order to provide the most efficient analytical separation, consider the case where there are no gaps between successive waves (i.e. p−b=0, in FIG. 1).

An effective driving force gives a velocity, Vge, can thus be derived, with units of m/s as shown in the equation below:

$$Vge = \tfrac{1}{2}(\sqrt{(s+4K^2E^2)}-s) \qquad \text{Equation (1):}$$

with s being the traveling wave speed, K being the ion mobility, and E being the magnitude of the opposing electric field.

Figure 2:
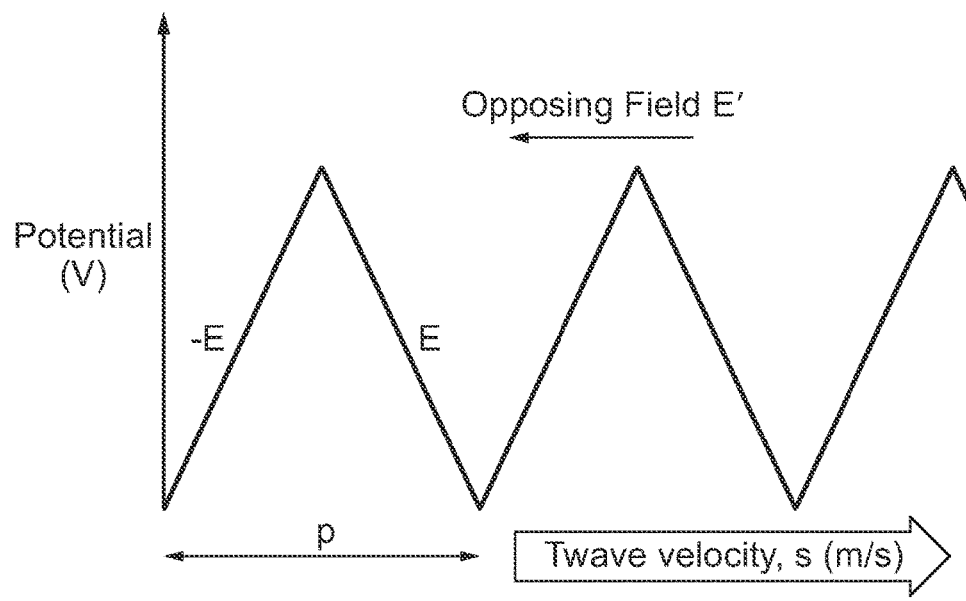
FIG. 2 shows how ions can be caused to take up equilibrium positions determined by a combination of traveling waves and an opposing electric field.

If an opposing field that varies with position along the length of the device, a trap can be created. For instance, in the present embodiments, an opposing electric field of strength E' is applied to the device that acts to urge ions in the opposite direction to the traveling waves. In particular, an opposing field is applied that increases linearly along the length of the device (such that E'(x)=A·x, where A is a constant, and x is axial position along the length of the device). This situation is illustrated in FIG. 2.

The one-dimensional partial differential equation for the motion of the ions in such a device is given by:

$$\frac{\partial n(x,t)}{\partial t} = -(Vge - AKx)\frac{\partial n(x,t)}{\partial x} + AKn(x,t) + D1\frac{\partial^2 n(x,t)}{\partial x^2} \qquad \text{Equation (2)}$$

where n(x,t) is the axial concentration of the ions as a function of time, the driving velocity imparted by the traveling wave is Vge, the ion mobility is K, DI is the diffusion coefficient and A is the steepness of the opposing electric field (such that E'(x)=Ax).

This equation has exact analytical solutions for ion position and spatial spread. The mean position of the ions in the first section 4 is a function of ion mobility and is given by:

$$\text{mean} = \frac{Vge(1 - e^{-AKt})}{KA} \qquad \text{Equation (3)}$$

where t is time and the width of the ion cloud is given by:

$$\sigma^2 = \frac{kT(1 - e^{-2AKt})}{Aq} \qquad \text{Equation (4)}$$

where $\sigma$ is the standard deviation width.

The exponential terms in both of the above equations diminish to zero given enough time, t, such that at equilibrium the mean position is inversely proportional to mobility, and the width is inversely proportional to the opposing electric field gradient, A.

An example of such a device whereby a traveling wave is directed against an opposing DC electric field is described in U.S. Pat. No. 6,791,078 (MICROMASS UK LIMITED). This device can potentially exploit the non-linear nature of the traveling wave to create an ion trapping device whereby ions also attain an equilibrium position within the guide trapping region. The opposing field can be gradually reduced to scan the ions out of the device, with ions having the highest mobility eluting first.

However, when operated in this manner, whilst providing various advantages compared to more traditional arrangements, the device described in U.S. Pat. No. 6,791,078 (MICROMASS UK LIMITED) may have a relatively limited resolution.

The present embodiments thus recognize the potential of such a device as a high space charge capacity trapping region that can be used to gradually pass ions into a second traveling wave device for temporal separation of the ions.

Figure 3:
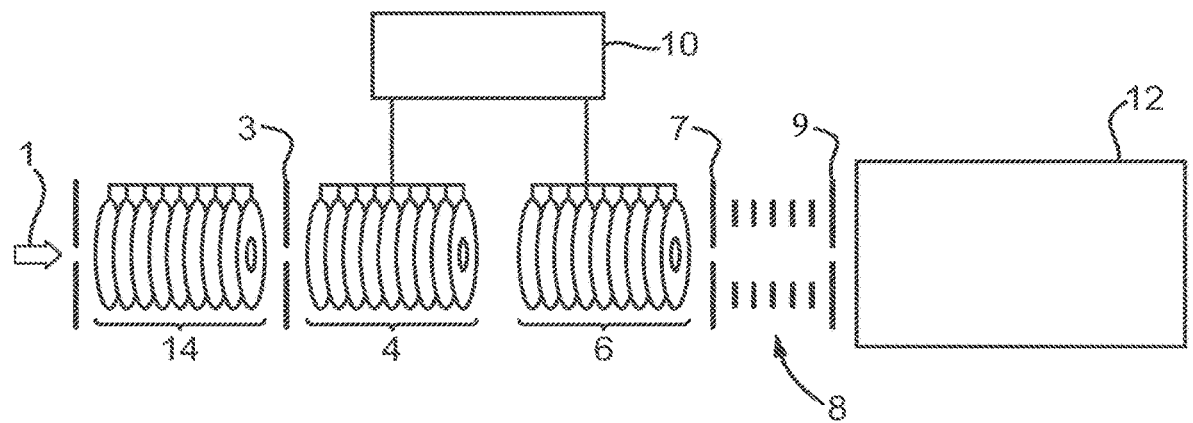
FIG. 3 shows schematically a mass spectrometer including ion mobility separator device in accordance with embodiments.

FIG. 3 shows schematically an example of a mass spectrometer including ion mobility separator device in accordance with embodiments. As shown in FIG. 3, ions 1 are generated by a suitable ion source (not shown) and passed into the instrument for analysis. In FIG. 3, the ions 1 are first passed into an ion trap 14, before being passed through a first differential aperture 3 into an ion mobility separator device having a first section 4 and a second section 6, the operation of which will be explained further below.

The ions are then separated in the ion mobility separator device and passed through a further differential aperture 7 optionally through other ion-optical components 8, as desired (such as focusing lenses, mass filters, collision cells, and so on) before passing through a final differential aperture 9 into a mass analyzer 12.

In the present embodiments the mass analyzer 12 comprises a multi-reflecting time of flight mass analyzer. However, other arrangements would of course be possible.

Figure 4:
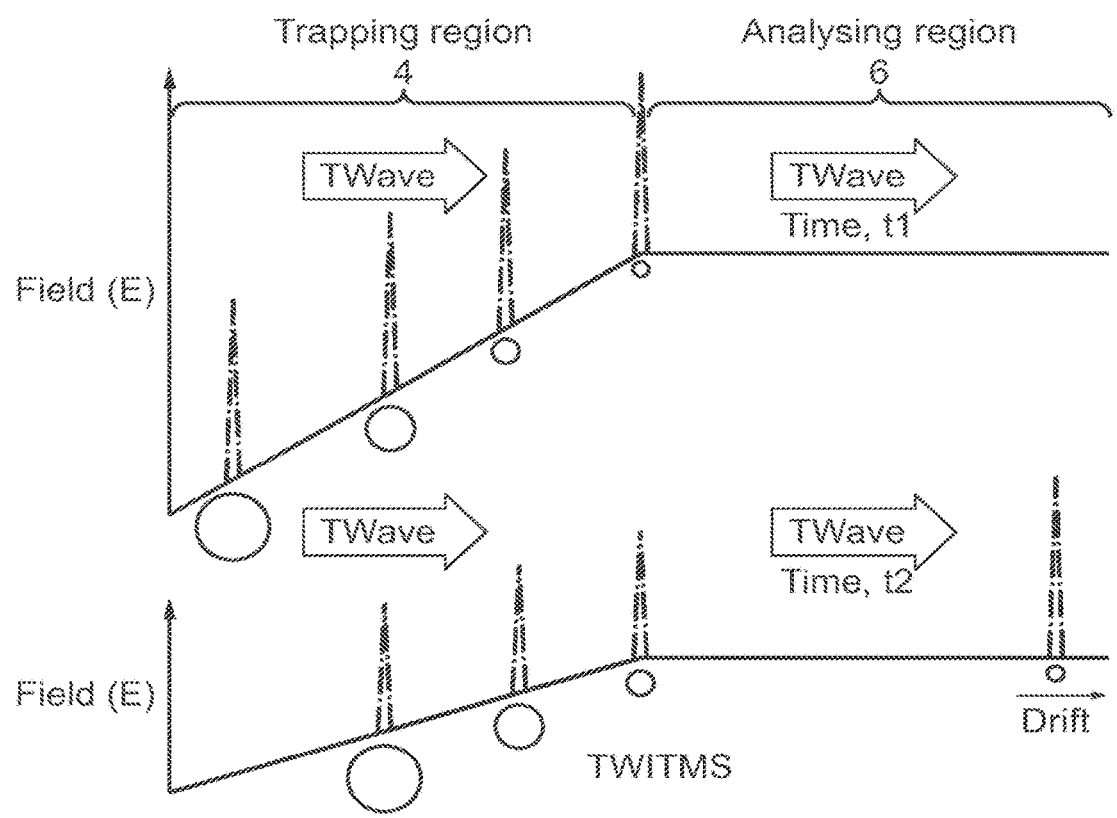
FIG. 4 shows schematically the operation of the ion mobility separator device in accordance with embodiments.

The operation of the ion mobility separator device is illustrated in FIG. 4. As shown in FIG. 4, the first section 4 of the ion mobility separator device acts as a 'trapping region', and the second section 6 acts as an 'analyzing region'.

In the first section 4 ions are urged axially by traveling waves against an opposing electric field such that the ions are caused to assume axial equilibrium positions with the ions being distributed along the length of the device according to their mobility (with the highest mobility, smallest ions closest to the exit of the first section 4 and the lowest mobility, largest ions closest to the entrance of the first section 4).

At the time, t1, all of the ions are trapped in the first section 4. The magnitude of the opposing electric field can then be reduced to allow the highest mobility, smallest ions to pass from the first section 4 into the second section 6. In the second section 6 the ions are urged by traveling waves against a uniform electric field and caused to separate temporally along the length of the second section.

Slowing ions down using such an opposing electric field in the second stage increases the work done per unit length by the ions when compared to a field free traveling wave device. This leads to a foreshortened device enabling high ion mobility resolutions to be achieved in compact devices.

The magnitudes of the opposing fields in the first and second sections are then gradually reduced, in tandem with one another, to progressively scan ions out of the device. The two fields are reduced in tandem at a desired rate according to the resolution required. This degree of freedom allows hybridization with downstream mass spectrometer stages that would otherwise be too slow for nested acquisition systems such as mass analyses having relatively slower intrinsic sample rates, such as multi-reflecting time of flight mass analyzers.

The first section 4 has an advantage in terms of space charge characteristics when compared to traditional optically thin ion gates employed in drift tube separations. For instance, in traditional ion gates, all the ions pile up immediately behind a pulsed electrode and a narrow time packet of ions is introduced into the drift tube (or traveling wave tube) for mobility separation. While RF confinement helps to prevent radial spreading during separation in the drift tube, this concentrated packet of charge causes discrimination and ion losses which is species dependent ultimately limiting the overall duty cycle of the hybrid instrument.

By contrast, in the first section 4 ions are distributed along a line of charge dramatically reducing space charge effects and increasing the capacity of the trap.

As the fields of the two sections 4, 6 scan down in tandem ions of decreasing mobility are admitted into the second section 6. The resolution of the separation, which is dominated by the second section 6, is given by:

$$Res = \sqrt{\frac{qVgetpEe}{16\log(2)kbT}} \qquad \text{Equation (5)}$$

where tp is the time spent traversing the second section of the device.

Simulation Results

The device described above in relation to FIG. 4 was simulated at a pressure of 1 mbar with a traveling wave velocity, s of 300 m/s and electric field strength of 1500 V/m. A range of reduced ion mobility's of Ko from $10^{-5}$ to $1.3 \times 10^{-5}$ m2/Vs giving K values of 0.01 to 0.13 m2/Vs at 1 mbar pressure were considered.

These traveling wave parameters prevent any of the ions surfing on the wave so the mobility separation still works (c=KE/s<1). The length of the both the trapping and analyzing region were set at 0.05 m.

The table below shows the mean equilibrium positions as indicated by the same spatial spread for all species:

TABLE 1

| Mobility K (m^2/Vs) | σ (m) | Position Mean (m) | Trap Spatial Resolution | Extract time (s) | Resolution TWITMS |
|---|---|---|---|---|---|
| 0.01 | 0.001320 | 0.0050 | 1.62 | 0.0447 | 3.0 |
| 0.02 | 0.001320 | 0.0101 | 3.24 | 0.0316 | 7.0 |
| 0.03 | 0.001320 | 0.0149 | 4.81 | 0.0258 | 11.5 |
| 0.04 | 0.001320 | 0.0196 | 6.31 | 0.0224 | 16.2 |
| 0.05 | 0.001320 | 0.0240 | 7.74 | 0.0200 | 21.0 |
| 0.06 | 0.001320 | 0.0281 | 9.08 | 0.0183 | 25.8 |
| 0.07 | 0.001320 | 0.0320 | 10.33 | 0.0169 | 30.5 |
| 0.08 | 0.001320 | 0.0356 | 11.50 | 0.0158 | 35.1 |
| 0.09 | 0.001320 | 0.0390 | 12.58 | 0.0149 | 39.5 |
| 0.1 | 0.001320 | 0.0421 | 13.57 | 0.0141 | 43.8 |
| 0.11 | 0.001320 | 0.0450 | 14.50 | 0.0135 | 47.9 |
| 0.12 | 0.001320 | 0.0476 | 15.35 | 0.0129 | 51.8 |
| 0.13 | 0.001320 | 0.0500 | 16.14 | 0.0124 | 55.6 |

According to Equation (4) all ions should have an equivalent positional spread at equilibrium, and this condition is reached in ions with a 0.03 s trapping time. The mean position shows where the different ions are at the time of analysis of the most mobile K=0.13 ion. At a value of A (the gradient of the opposing electric field in the first section 4) of 14760 V/m$^2$, the K=0.13 m$^2$/Vs ion has reached the end of the trapping region (mean=0.05 m) and enters the analysis region (second section 6) for temporal separation.

The resolution figures in the last column represent dispersion in the analyzing region given a scan rate in the analyzing field of 5000 V/m/s which covers the entire mobility range in around 0.05 seconds. It assumes that the different ions have reached their equilibrium positions at the end of the trapping region to start their analysis portion. The lower resolution of the low mobility ions comes from the low Vge for these ions according to Equations (1) and (5). The above table shows how the temporal resolution of the second stage exceeds the spatial resolution of the trapping section, with the highest mobility resolution of 55.6 for the most mobile ion of K=0.13 m$^2$/Vs.

The above simulation results are shown for chosen traveling wave parameters such that c<1 for all ions. This results in lower resolution for the low mobility species. High mobility ions have a higher value of c for a given set of traveling wave parameters but as they exit the device first it is possible to dynamically change the parameters of the traveling waves such that the value of c and the gradient A increase in tandem to allow for higher resolution for the lower mobility ions.

Thus, by scanning both the first and second sections in tandem, ions can be progressively introduced into the second section, with the second section being arranged to effectively 'track' the mobilities of the ions that are received from the first section, and to optimize the separation accordingly.

Whilst various examples have been presented above in the context of DC traveling waves, it will be understood that other traveling wave implementations would be possible, including the use of AC or RF traveling waves of the type described in U.S. Pat. No. 6,894,286 (UNIVERSITY OF WARWICK).

Thus, although the present invention has been described with reference to preferred embodiments, it will be understood by those skilled in the art that various changes in form and detail may be made without departing from the scope of the invention as set forth in the accompanying claims.

The invention claimed is:

1. A method of separating ions according to their ion mobility using an ion mobility separation device including a first section comprising a first plurality of electrodes and a second section comprising a second plurality of electrodes, the method comprising:
   urging ions through the first section against a first opposing electric field using a first driving force provided by a first set of one or more time varying voltage(s) or voltage waveform(s) applied to the electrodes of the first section, the first opposing field increasing in magnitude along the length of the first section, such that the ions are caused to distribute along the first section at equilibrium positions determined by their mobility;
   progressively reducing the magnitude of the first opposing electric field and/or progressively increasing the magnitude of the first driving force over time so that ions sequentially pass from the first section into the second section in order of mobility; and
   driving ions through the second section against a second opposing electric field using a second drive force provided by a second set of one or more time-varying voltage(s) or voltage waveform(s) applied to the electrodes of the second section such that ions separate temporally in the second section, wherein the second opposing electric field is substantially uniform along the length of the second section,
   wherein the magnitude of the second opposing electric field is progressively reduced and/or the magnitude of the second driving force is progressively increased in tandem with reducing the magnitude of the first opposing electric field and/or increasing the magnitude of the first driving force.

2. The method of claim 1, wherein ions pass sequentially from the first section into the second section in order of mobility from high to low.

3. The method of claim 1, comprising trapping the ions upstream of the first section in an ion trap, and periodically releasing ions from the ion trap into the first section.

4. The method of claim 3, wherein ions are prevented from entering the first section from the ion trap during time periods when ions are being passed from the first section into the second section.

5. The method of claim 1, wherein the first section and/or the second section comprises: (i) a stack of plate or ring electrodes having apertures therein through which ions travel in use; (ii) a segmented rod set.

6. The method of claim 1, wherein ions are radially confined within the first section and/or the second section using one or more RF voltage(s).

7. The method of claim 1, comprising mass analysing the ions that have been separated in the second section.

8. The method of claim 7, wherein the ions are mass analysed using a time of flight mass analyser, optionally wherein the time of flight mass analyser is a multi-reflecting time of flight mass analyser.

9. The invention of claim 1, wherein the first and/or second sets of one or more time varying voltage(s) or voltage waveform(s) comprise sets of one or more transient DC voltage(s) or voltage waveform(s).

10. The invention of claim 1, wherein the first and/or second sets of one or more time varying voltage(s) or voltage waveform(s) comprise sets of one or more RF voltage(s) or voltage waveform(s).

11. An ion mobility separation device comprising:
    a first section comprising a first plurality of electrodes, wherein ions are urged in use through the first section against a first opposing electric field by a first driving force provided by a first set of one or more time-varying voltage(s) or voltage waveform(s) applied to the electrodes of the first section, the first opposing field increasing in magnitude along the length of the first section, such that the ions are caused to distribute along the first section at equilibrium positions determined by their mobility;

a second section comprising a second plurality of electrodes, wherein ions are driven in use through the second section against a second opposing electric field by a second driving force provided by a second set of one or more time-varying voltage(s) or voltage waveform(s) applied to the electrodes of the second section such that ions separate temporally in the second section, wherein the second opposing electric field is substantially uniform along the length of the second section; and a control circuit configured to:

progressively reduce the magnitude of the first opposing electric field and/or progressively increase the magnitude of the first driving force over time in tandem with the second opposing electric field and/or second driving force to cause ions to sequentially pass from the first section into the second section in order of mobility and to separate in the second section according to mobility.

12. The ion mobility separation device of claim 11, wherein ions pass sequentially from the first section into the second section in order of mobility from high to low.

13. The ion mobility separation device of claim 11, comprising an ion trap upstream of the first section.

14. The ion mobility separation device of claim 13, wherein the control circuit is configured to hold ions in the ion trap at least during time periods when ions are being passed from the first section into the second section.

15. The ion mobility separation device of claim 11, wherein the first section and/or the second section comprises: (i) a stack of plate or ring electrodes having apertures therein through which ions travel in use; (ii) a segmented rod set.

16. The ion mobility separation device of claim 11, wherein ions are radially confined within the first section and/or the second section using one or more RF voltage(s).

17. A mass spectrometer comprising an ion mobility separation device as claimed in claim 11 and a mass analyser for mass analysing ions that have been separated in the second section.

18. The mass spectrometer of claim 17 wherein the mass analyser comprises a time of flight mass analyser, optionally wherein the time of flight mass analyser is a multi-reflecting time of flight mass analyser.

\* \* \* \* \*